(12) United States Patent
Bormann (10) Patent No.: US 12,036,646 B1
(45) Date of Patent: Jul. 16, 2024

(54) FASTENER SET TOOL

(71) Applicant: Josh J. Bormann, Bryant, IA (US)

(72) Inventor: Josh J. Bormann, Bryant, IA (US)

(*) Notice: Subject to any disclaimer, the term of this patent is extended or adjusted under 35 U.S.C. 154(b) by 355 days.

(21) Appl. No.: 17/179,385

(22) Filed: Feb. 18, 2021

Related U.S. Application Data (60) Provisional application No. 62/977,807, filed on Feb. 18, 2020.

(51) Int. Cl.
*B25B 27/00* (2006.01)
*B25B 31/00* (2006.01)
*F16L 3/10* (2006.01)

(52) U.S. Cl.
CPC ............... *B25B 31/00* (2013.01); *F16L 3/10* (2013.01)

(58) Field of Classification Search
CPC ......... B25B 31/00; B25B 27/00; B25C 3/006; B25D 1/06
See application file for complete search history.

(56) References Cited

U.S. PATENT DOCUMENTS

| | | | | |
|---|---|---|---|---|
| 1,159,963 A * | 11/1915 | Landgraf | ............... | E04F 21/22 81/46 |
| 2,522,440 A * | 9/1950 | Freter | ............... | B21D 28/34 29/90.01 |
| 3,979,978 A * | 9/1976 | Smolik | ............... | B25C 3/006 144/134.1 |
| 4,249,297 A * | 2/1981 | Waters | ............... | B25C 3/006 81/23 |
| 4,465,115 A * | 8/1984 | Palomera | ............... | B25D 1/06 81/24 |
| 4,903,882 A * | 2/1990 | Long | ............... | H02G 1/00 227/147 |
| D594,305 S * | 6/2009 | Gyder | ............... | D8/70 |
| 9,017,339 B2 * | 4/2015 | Edelhauser | ............... | A61B 17/7074 33/512 |
| 9,242,358 B2 * | 1/2016 | MacArthur | ............... | B25J 15/0616 |
| D769,096 S * | 10/2016 | Hung | ............... | D8/51 |
| 2013/0227846 A1 * | 9/2013 | Buzzell | ............... | B43L 7/0275 33/32.2 |

* cited by examiner

*Primary Examiner* — Lee D Wilson
(74) *Attorney, Agent, or Firm* — Hamilton IP Law, PC.; Jay R. Hamilton (57) ABSTRACT

A fastener set tool is disclosed allowing for the holding and then delivery of force to install a fastener with reduced exposure to the user of the fastener set tool than without use of the tool.

9 Claims, 14 Drawing Sheets

FASTENER SET TOOL

CROSS REFERENCE TO RELATED APPLICATIONS

The present application claims priority from utility provisional U.S. Pat. App. No. 62/977,807 filed on Feb. 18, 2020, which is incorporated by reference herein in its entirety.

FIELD OF INVENTION

This application relates to a method and apparatus allowing for simplified and rapid installation of fasteners, particularly, fasteners useful for holding electrical cables or conduit, without limitation of restriction. As disclosed, the invention combines a hand tool having a first end configured to hold a fastener for mounting to a surface with a second end which may be struck with a hammer or other impact device to provide a percussive blow that delivers force to the first end in sufficient quantity as to drive the fastener onto the mounting surface thereby mounting the fastener to the mounting surface.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. § 1.171 (d)(c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

SUMMARY OF THE INVENTION

Figure 1:
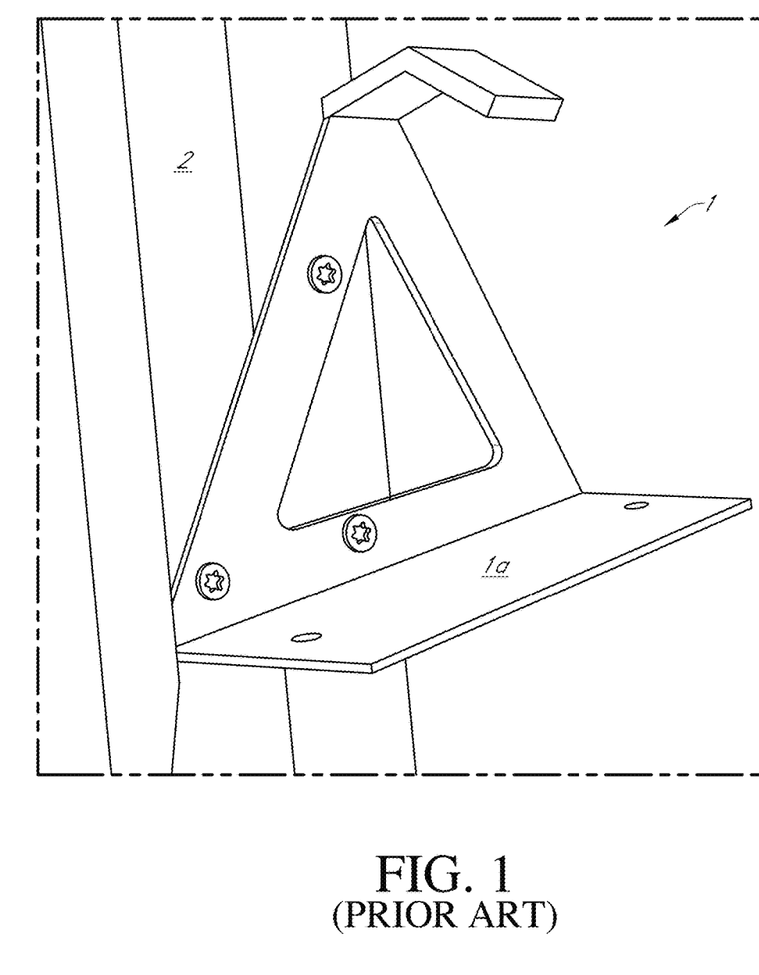
FIG. 1 illustrates a perspective view of a hanger as found in the Prior Art attached to a two by four.
Figure 2:
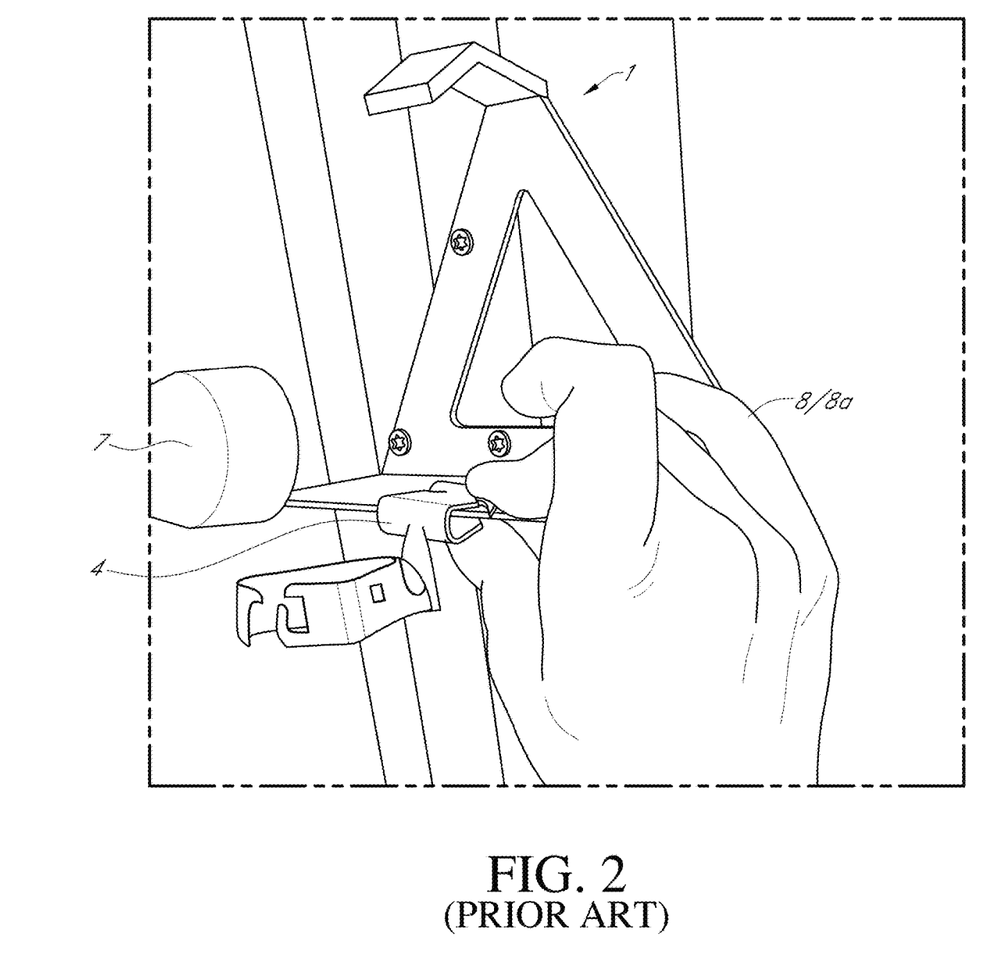
FIG. 2 illustrates a perspective view of a fastener that is configured for attachment to the flat portion of the hanger during installation as found in the Prior Art. As shown, a user is using a hammer to attach the fastener to the flat portion of the hanger.

The Fastener Set Tool is easy to use and increases work productivity by cutting down on the time it takes to install a fastener to a flange, beam or other flat surface. The Fastener Set Tool as disclosed herein provides a safer alternative to the installation of fasteners. As disclosed and discussed further, the typical prior art method of installing fasteners onto a flange as shown in FIGS. 1-2 increases the risk of a user hammering their fingers as well as the fastener flying off and injuring other workers creating a dangerous work environment.

BRIEF DESCRIPTION OF THE FIGURES

In order that the advantages of the present disclosure will be readily understood, a more particular description of various illustrative embodiments briefly described above will be rendered by reference to specific embodiments illustrated in the appended drawings. Understanding that these drawings depict only typical embodiments and are not therefore to be considered limiting of its scope unless otherwise indicated in the following claims, the illustrative embodiments will be described and explained with additional specificity and detail through the use of the accompanying drawings.

Appendix A: Fastener Set Tool Installation Directions.
Appendix B: BritClips® Flange Beam Clips
Appendix C: BritClips® Poster Appendices A, B and C are incorporated by reference herein as if fully set forth.

| DETAILED DESCRIPTION - LISTING OF ELEMENTS | |
| --- | --- |
| ELEMENT DESCRIPTION | ELEMENT # |
| Hanger | 1 |
| Flat portion | 1a |
| Two by four (2 × 4) | 3 |
| Fastener | 4 |
| Mounting portion | 4a |
| Neck | 4b |
| Clamp portion | 4c |
| Hammer | 7 |
| User | 8 |
| Hand | 8a |
| Fingers | 8b |
|  | 9 |
| Fastener Set Tool | 10 |

DETAILED DESCRIPTION - LISTING OF ELEMENTS

| ELEMENT DESCRIPTION | ELEMENT # |
|---|---|
| First End | 11 |
| Arm(s) | 11a |
| Neck entry opening | 11b |
| Backwall | 11c |
| Upper portion | 11d |
| Face | 11e |
| Fastener entry recess | 11f |
| Well | 11g |
| Additional recess (upper face) | 11h |
| Handle aperture | 11i |
| Second End | 12 |
| Handle | 13 |
| Handle pin | 13a |
| Post | 13b |
| Post aperture | 13c |

DETAILED DESCRIPTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments/aspects only and is not intended to be limiting. As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Aspect" when referring to a method, apparatus, and/or component thereof does not mean that limitation, functionality, component etc. referred to as an aspect is required, but rather that it is one part of a particular illustrative disclosure and not limiting to the scope of the method, apparatus, and/or component thereof unless so indicated in the following claims.

Throughout the description and claims of this specification, the word "comprise" and variations of the word, such as "comprising" and "comprises," means "including but not limited to," and is not intended to exclude, for example, other components, integers or steps. "Exemplary" means "an example of and is not intended to convey an indication of a preferred or ideal embodiment. "Such as" is not used in a restrictive sense, but for explanatory purposes. Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

It is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

Referring now to the drawings, wherein like reference numerals designate identical or corresponding parts throughout the several views, FIG. 1 illustrates a perspective view of a hanger 1 as found in the Prior Art attached to a two by four (2×4) 3 which is useful to illustrate the typical use of the fastener without limitation or restriction as to the application of the Fastener Set Tool (hereinafter simply "Tool"), its configuration or the fastener or its configuration or application. The flat portion 1a of the hanger 1 illustrates one type of surface which the fastener 4 may be affixed to which is similar to a beam to which a fastener 4 may be attached (not shown). FIG. 2 illustrates a perspective view of a fastener 4 that is configured for attachment to the flat portion 1a of the hanger 1 during installation as found in the Prior Art. As shown, a user 8 is holding the fastener 4 in their hands and fingers (8a/8b) using a hammer 7 to attach the fastener 4 to the flat portion 1a of the hanger 1.

Figure 2A:
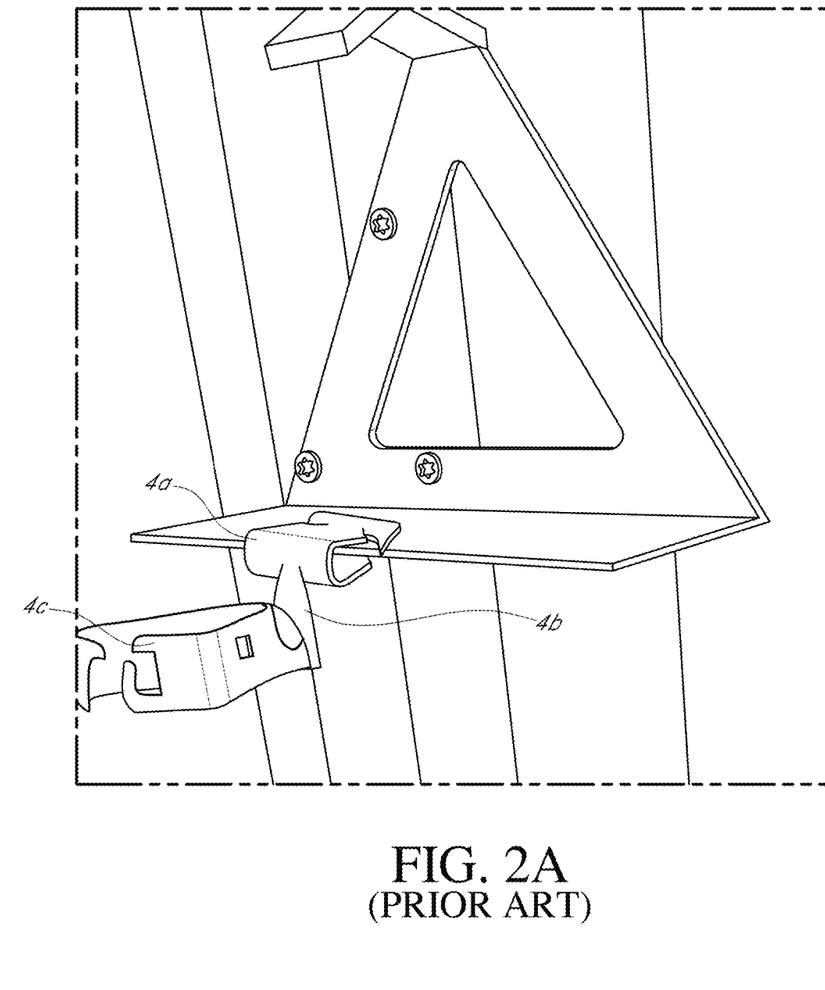
FIG. 2A illustrates a perspective view of the fastener attached to the flat portion of the hanger after installation.

FIG. 2A illustrates a perspective view of the fastener 4 during installation onto the flat portion 1a of the hanger 1. The fastener 4 is designed with a mounting portion 4a, a neck 4b and a clamp portion 4c that secures the cable or conduit (not shown). One of ordinary skill will appreciate that as configured, this particular type of fastener 4 is designed having the mounting portion 4a open up and accept insertion of the flat portion 1a. Applying force to the first end 11, via a hammer 7 as shown is FIG. 2, is necessary to open the mounting portion to accept the flat surface and is typically more than can be simply be applied by a user 8 without a hammer 7 or other tool (i.e. pliers, channel locks and wrenches, without limitation or restriction, understood but not shown). The neck 4b attached to the clamp portion 4c can obscure direct application of the hammer onto the fastener 4 and potentially expose the user 8 to injury when holding the fastener 4 and attempting to install or mount the fastener 4 on a hanger or a beam. For additional background on the fasteners, and particularly beam clips type fasteners to which the present application applies, applicant includes herein a portion of the Walraven catalog discussing a Brit-Clips® Beam clip for flange which is for solid fixing to steel construction without the need for welding or drilling having a fixing hole (Ø 6.5 mm) to fix S-hook, bolt/nut, etc. and constructed of spring steel (type CS70) (See Appendix B). Further, applicant includes herein a poster providing configurations, specifications, and demonstrative uses for various fasteners to which the following tool 10 may be used including beam clips, light duty rod hangers, threaded rod hangers, cable tie clips and cable run tie clips, for purposes of illustration without limitation or restriction in application. (See Appendix C).

Figure 3A:
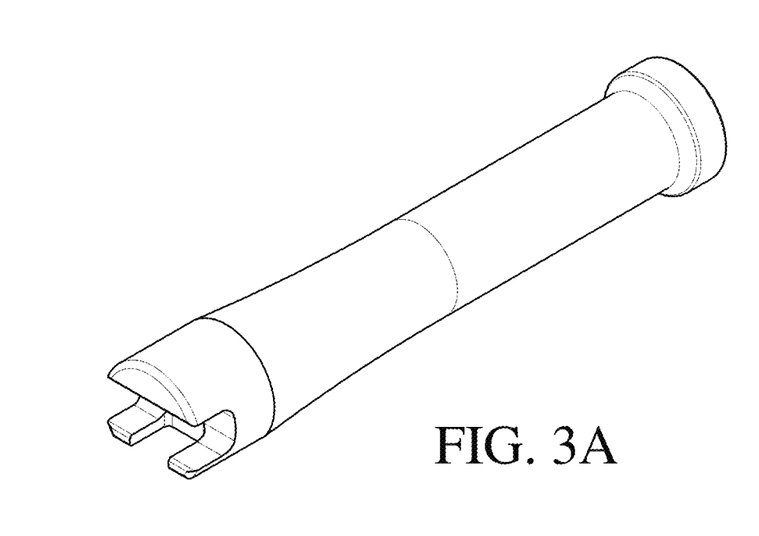
FIGS. 3A-3D provide, respectively, perspective, top, side and front views of the Fastener Set Tool subject of the present disclosure.
Figure 3B:
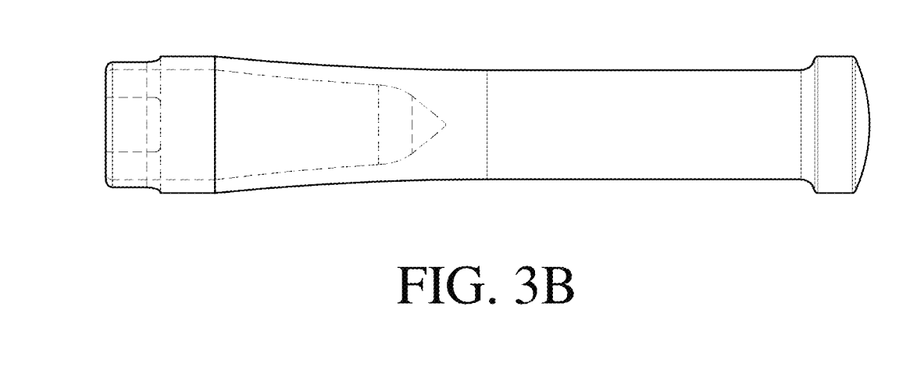
Figure 3C:
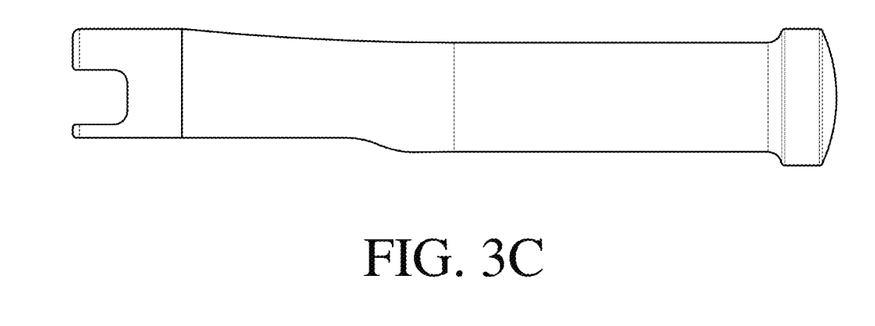
Figure 3D:
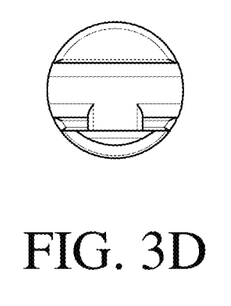

FIGS. 3A-3D provide, respectively, perspective, top, side and front views of the Fastener Set Tool 10 subject of the present application, in at least one embodiment. The dimensions set forth on the Fastener Set Tool 10 as found in FIGS. 3B-3C are incorporated by reference herein and provided for purposes of enabling one of ordinary skill in the art as to implementation of at least one embodiment of the present disclosure. The dimensions shown and set forth do not limit or restrict the scope of the present disclosure.

Figure 4:
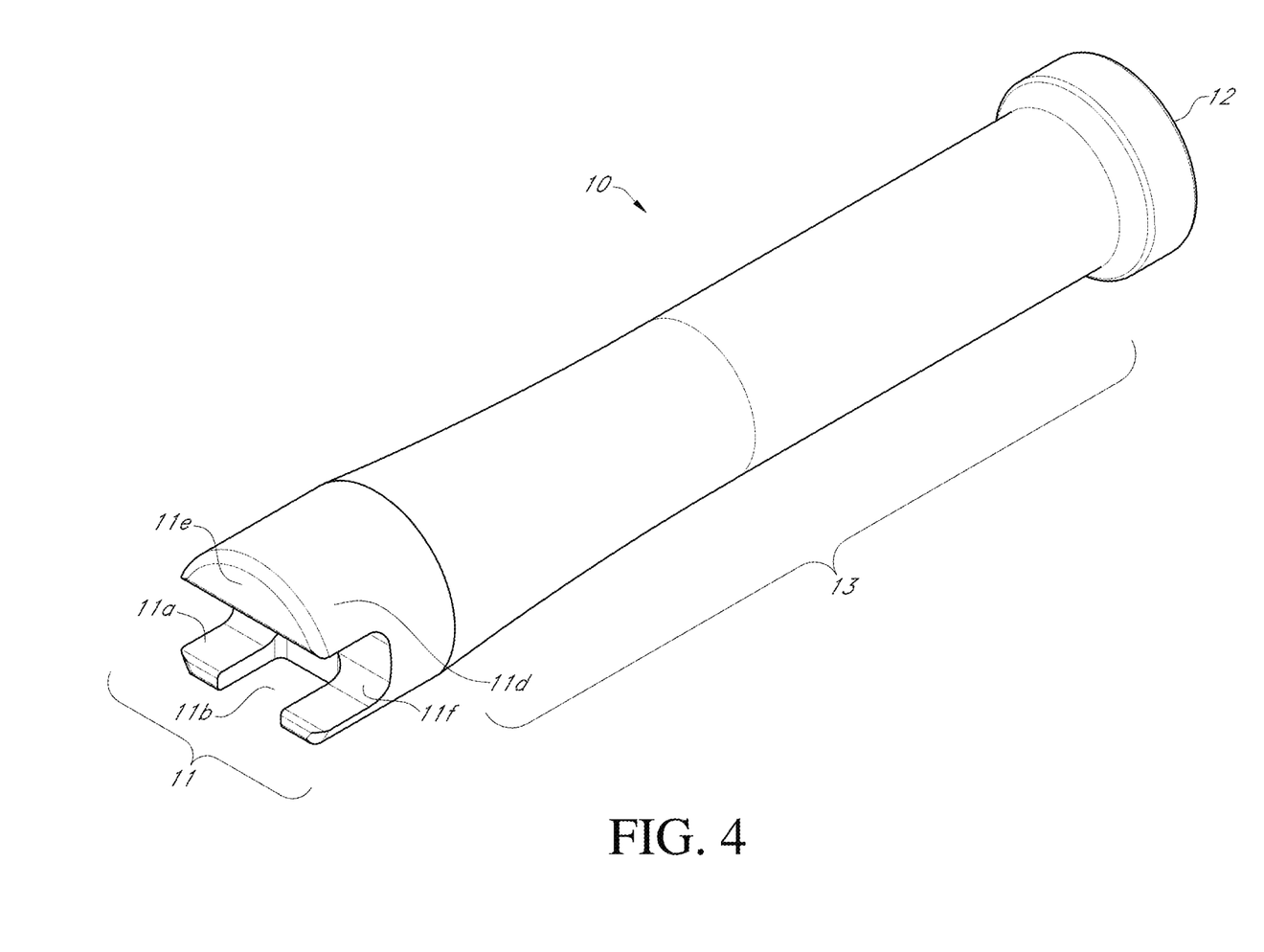
FIG. 4 illustrates a detailed perspective view of the Fastener Set Tool as disclosed with the first end having appropriate call-outs illustrating half-moon shape of the upper and lower portions.

FIG. 4 illustrates the detailed perspective view of the Fastener Set Tool 10 as shown above in FIG. 3A with appropriate call-outs added to the various elements. As shown, the Fastener Set Tool 10 has a first end 11 and a second end 12 with a central portion configured as the handle 13. The second end 12 is configured to accept a blow from a hammer 7 which is delivered through the handle 13 configured as a barrel to the first end 11 to the fastener 4 positioned therein (See FIG. 6 also). As shown, the first end 11 is configured with an upper portion and a lower portion. The upper portion has a half moon shape with a flat face 11e which forms a recess (labeled fastener entry recess 11f) which accepts the back of the mounting portion 4a of fastener 4 and allows the back of the fastener 4 to engage with and press against the backwall 11c. (See FIG. 6) The lower portion is configured with a set of arms (11a) that create a space (neck entry opening 11b) between the arms 11a proximate the middle, in the lateral dimension, of the first end, fixing the lateral position of the fastener 4 in the fastener set tool 10. As understood from FIG. 4 and further illustrated in FIGS. 5 and 6, the arms 11a surround the neck entry opening 11b which is configured to accept the neck portion 4b of the fastener.

Figure 5:
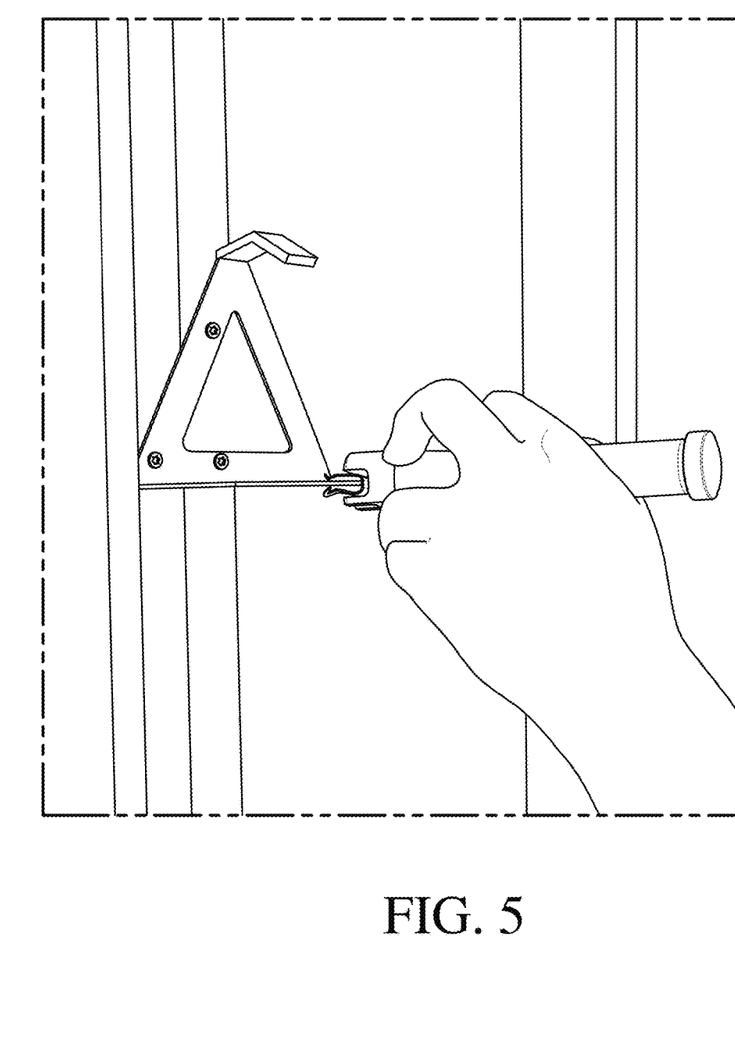
FIG. 5 illustrates a perspective view of the Fastener Set Tool during installation of the fastener to the flat portion of the hanger, according to the Installation Directions as found in Appendix A.

FIG. 5 illustrates a perspective view of the Fastener Set Tool 10 during installation of the fastener 4 to the flat portion 1a of the hanger, according to the Installation Directions as found in Appendix A and illustrates the user's hand around the central portion (handle 13) of the set fastener tool 10 and that the tool allows the user 8 to use a hammer 7 (or other tool) to apply force to the second end, through the barrel to the first end of the tool without directly hitting the fastener 4 and with reduced exposure to the user 8.

Figure 6:
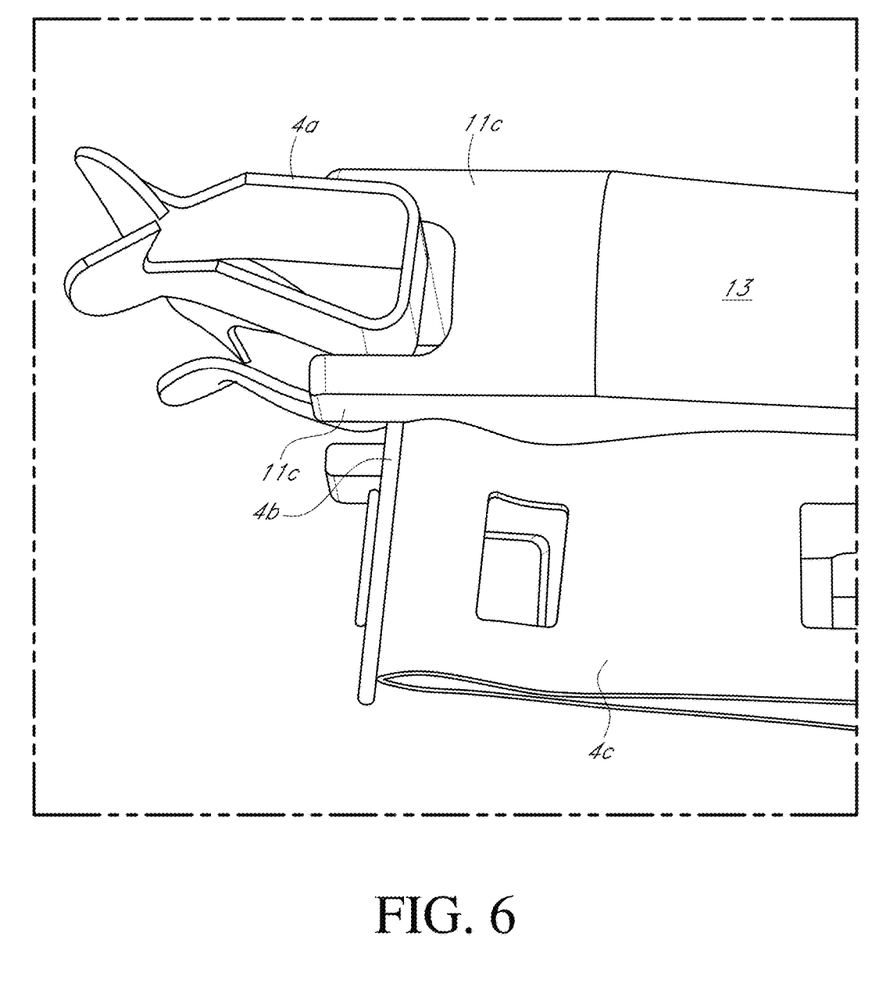
FIG. 6 is a detailed side view of just the end of the Fastener Set Tool engaged with a fastener.

FIG. 6 is a detailed side view of just the first end of the fastener set tool 11 engaged with a fastener 4 as disclosed herein. As shown the mounting portion 4a of the fastener is positioned between the upper portion 11d and the arms 11a with the back end of the fastener 4 adjacent to or resting against the backwall 11c of the tool 10 in the fastener entry recess 11f formed. The neck 4b of the fastener 4 is positioned between the arms 11a in the neck entry opening 11b. As shown, the fastener 4 is positioned for installation as shown in FIG. 5.

Figure 7:
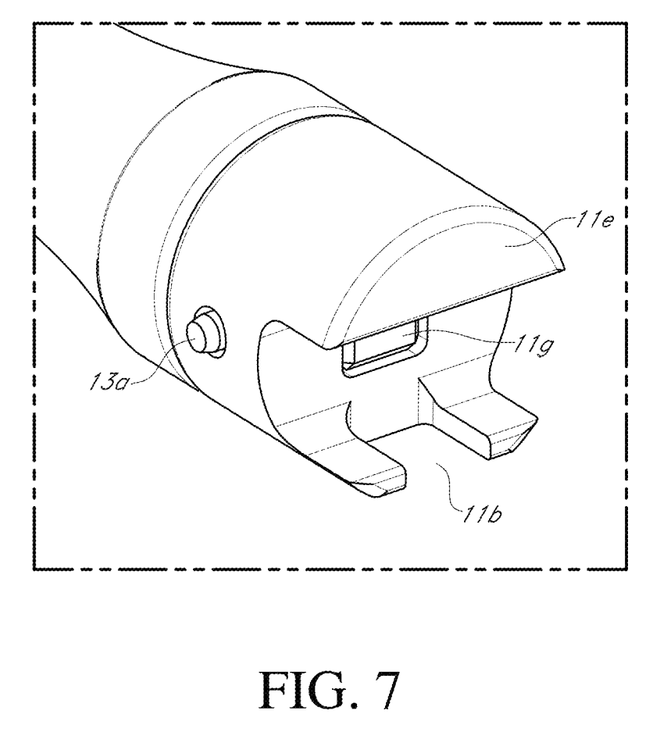
FIG. 7 is a detailed front perspective view of another embodiment of the Fastener Set Tool wherein the handle may be detachable from the first end.
Figure 8:
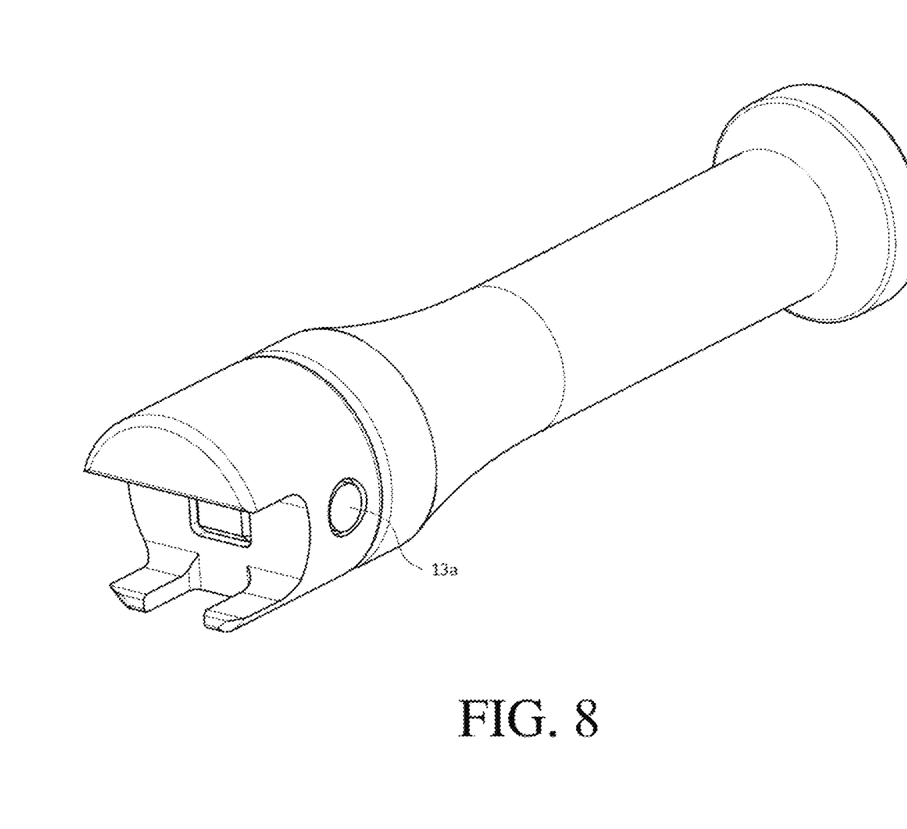
FIG. 8 is a front perspective view of the embodiment shown in FIG. 7 wherein the handle is detachable from the first end via the handle pin and handle aperture.

FIG. 7 is a detailed front perspective view of another embodiment of the Fastener Set Tool 10 wherein the handle 13 may be detachable from the first end 11. FIG. 8 is a front perspective view of the embodiment shown in FIG. 7 wherein the handle 13 is detachable from the first end 11 via the handle pin 13a and handle aperture 11i.

Figure 9:
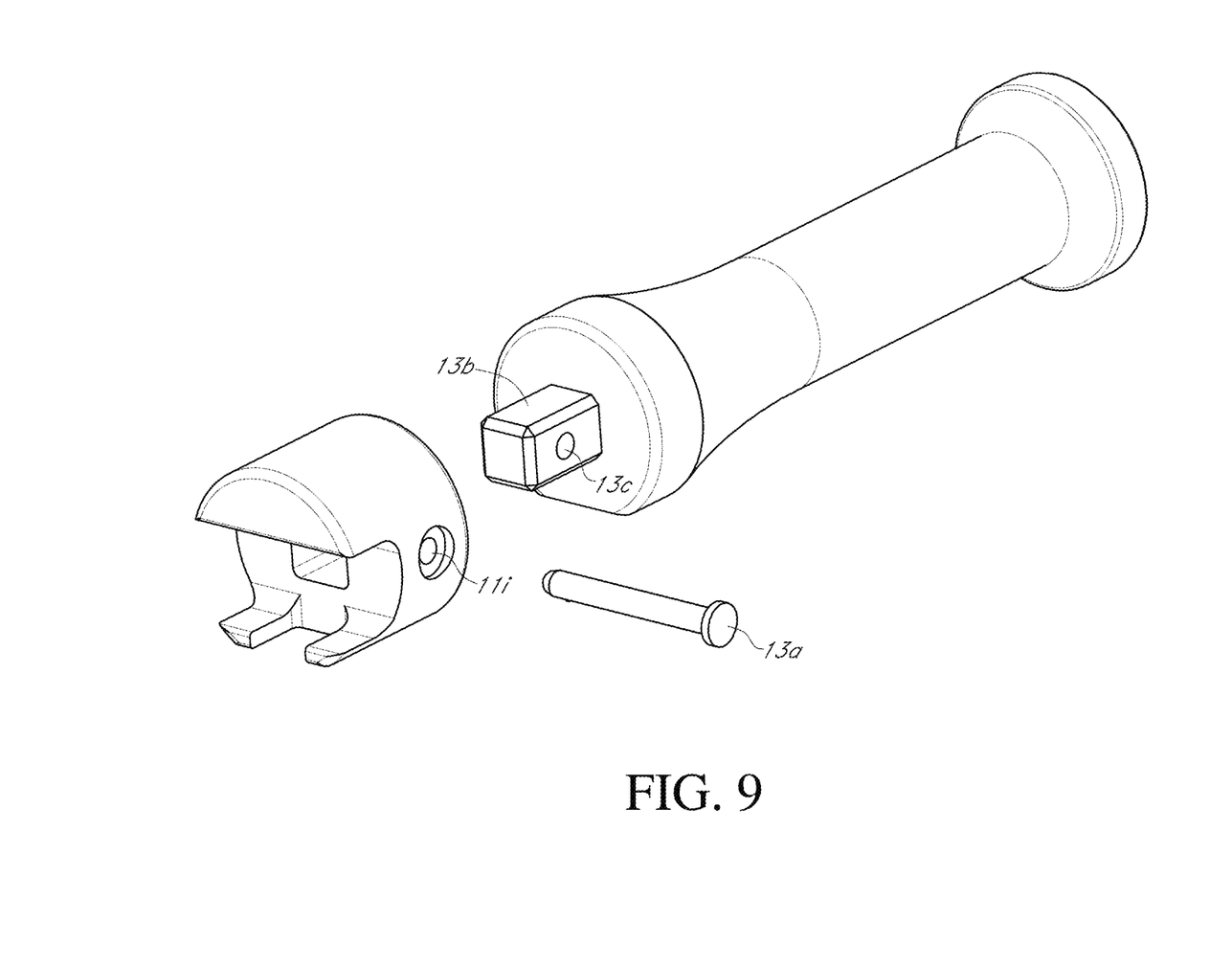
FIG. 9 is an exploded view of FIGS. 7 and 8 where the handle is detached from the first end illustrating the handle post and first end well.

FIG. 9 is an exploded view of FIGS. 7 and 8. As shown, the handle 13 is detached from the first end 11 illustrating the handle post 13b configuration for insertion and engagement with the first end well 11g.

Figure 10:
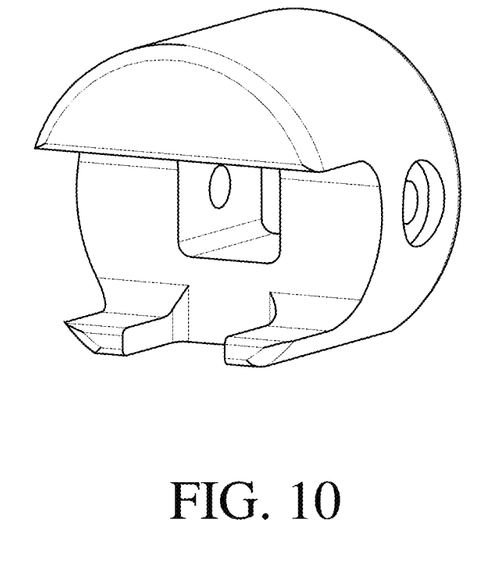
FIGS. 10 and 11 are detailed front perspective views of the first end illustrating the relationship between the handle, handle pin, handle aperture and post.
Figure 11:
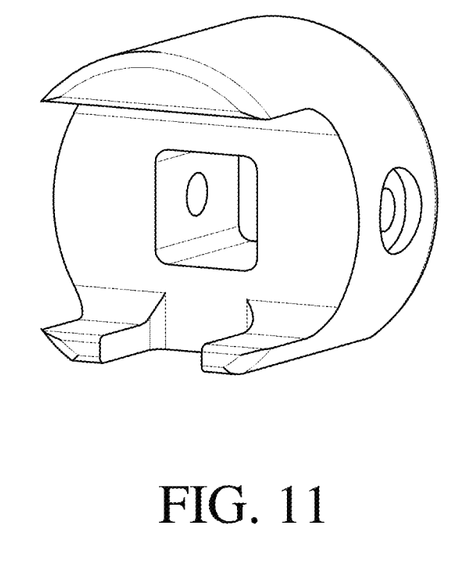

FIGS. 10 and 11 are detailed front perspective views of the first end illustrating the relationship between the handle 13, the handle aperture 11i positioned in and transverse to the body of the handle 13 and post 13b.

Figure 12:
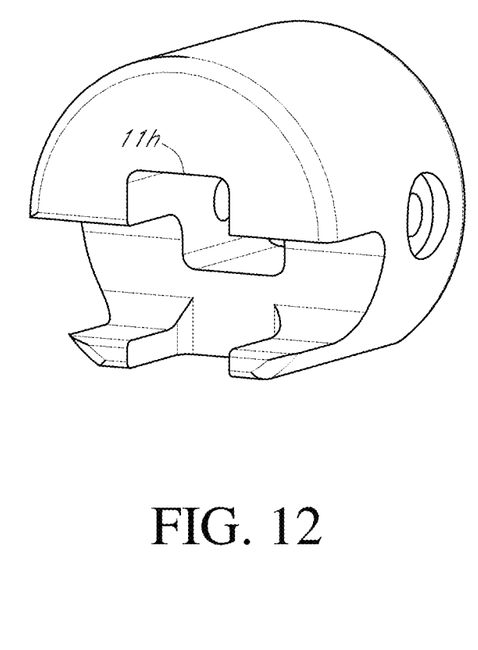
FIG. 12 is a detailed front perspective view similar to FIGS. 10 and 11 illustrating another embodiment of the first end wherein the upper portion of the front face has been modified with an additional recess for use with a particular fastener configuration.

FIG. 12 is a detailed front perspective view similar to FIGS. 10 and 11 illustrating another embodiment of the first end 11 wherein the upper portion of the front face 11e has been modified with an additional recess 11h for use with a particular fastener configuration (not shown but understood; see Appendices B and C). One of ordinary will appreciate that other configurations that allow for attachment/detachment of the first end 11 and the second end 12 of the tool are possible and contemplated without departure from this application including use of a spring-loaded ball and recess (not shown).

Although the illustrative apparatuses and processes described and disclosed herein may be configured for use with fasteners comprised primarily of metallic materials and their alloys, the scope of the present disclosure is not so limited and extends to any beneficial and/or advantageous use and/or configuration thereof without limitation unless so indicated in the following claims.

The materials used to construct the apparatuses and/or components thereof may vary depending on the specific application thereof, but it is contemplated that polymers, synthetic materials, metals, metal alloys, natural materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various processes and apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the apparatuses and methods and/or embodiments thereof as pictured and described herein are for illustrative purposes only, and the scope of the present disclosure extends to all processes, apparatuses, and/or structures for providing the various benefits and/or features of the present disclosure unless so indicated in the following claims, such as all similar apparatuses for allowing modification or improvement of a tool including using the various elements disclosed herein as part of the Fastener Set Tool 10 as suitable for the application.

While various apparatuses and methods according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the processes and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the apparatuses and methods disclosed herein are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps, process parameters, etc. of the apparatuses and methods disclosed herein may be used alone or in combination with one another depending on the compatibility of the features, components, functionalities, advantages, aspects, configurations, process steps, process parameters, etc. Accordingly, a nearly infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

What is claimed is:

1. A fastener set tool comprising:
   a. a first end configured for engagement with a fastener, the first end further comprising:
      i. an upper portion formed with an arcuate face with a flat side enclosing the arcuate face surrounding an opening;
      ii. a lower portion configured as a pair of arms surrounding the opening, the upper portion and lower portions together forming an engagement recess to hold and position a fastener;
   a. a second end connected to the first end and having a second diameter, the second end configured to allow a percussive force to be applied to the second end for transmission of the percussive force to the first end, wherein the second end has an enlarged circular portion having a width;
   c. a handle connecting the first end and the second end, wherein the handle dlameter is less than the first diameter and the second diameter.

2. The fastener set tool according to claim 1 wherein the upper portion of the first end is formed in a half-moon shape.

3. The fastener set tool according to claim 2 wherein the upper portion of the first end is formed with a flat face.

4. The fastener set tool according to claim 1 wherein the position of the second end in relation to the first end protects the fastener from exposure to a hammer delivering a percussive force to the second end.

5. The fastener set tool according to claim 1 wherein the second end is configured as a handle.

6. The fastener set tool according to claim 5 wherein the handle is configured as a barrel.

7. A method of mounting a fastener to a surface comprising:
   a. positioning a fastener within a fastener set tool, the fastener set tool further comprising:
      i. a first end configured for engagement with a fastener, the first end further comprising:
      a. an upper portion formed with an arcuate face with a flat side enclosing the arcuate face surrounding an opening;
      b. a lower portion configured as a pair of arms surrounding the opening, the upper portion and lower portions together forming an engagement recess to hold and position a fastener;
      ii. a second end connected to the first end, the second end configured to allow a percussive force to be applied to the second end for transmission of the percussive force to the first end;
   b. applying a percussive force to the second end with enlarged circular portion having a width for transmission of the percussive force to the first end via the handle connecting the first end and the second end, wherein the handle diameter is less than the first diameter and the second diameter to engage the fastener to the surface.

8. The method of mounting a fastener to a surface according to claim 7 wherein the upper portion of the first end is configured in a half-moon shape.

9. The method of mounting a fastener to a surface according to claim 7 wherein the upper portion of the first end is formed with a flat face.

* * * * *